United States Patent [19]

Scott

[11] Patent Number: 4,652,096

[45] Date of Patent: Mar. 24, 1987

[54] SHIELD

[76] Inventor: David J. Scott, 17141 Ardmore Ave., Bellflower, Calif. 90706

[21] Appl. No.: 718,700

[22] Filed: Apr. 1, 1985

[51] Int. Cl.⁴ .................. G02B 23/12; G02B 23/16
[52] U.S. Cl. .................................... 350/540; 350/321; 350/538; 200/43.16
[58] Field of Search ............... 350/540, 538, 321, 543, 350/544; 200/43.16, 43.18, 304, 43.22

[56] References Cited

U.S. PATENT DOCUMENTS 3,207,025  9/1965  MacDonald ........................ 350/540

Primary Examiner—Jon W. Henry
Attorney, Agent, or Firm—John H. Tregoning

[57] ABSTRACT

A periscope instrument control protection plate having specific finger openings for predetermined positioning over instrument controls, said plate having sides affixable to said control periscope to thereby position said protection panel plate to provide external finger adjustment and damage protection of said predetermined controls.

2 Claims, 6 Drawing Figures

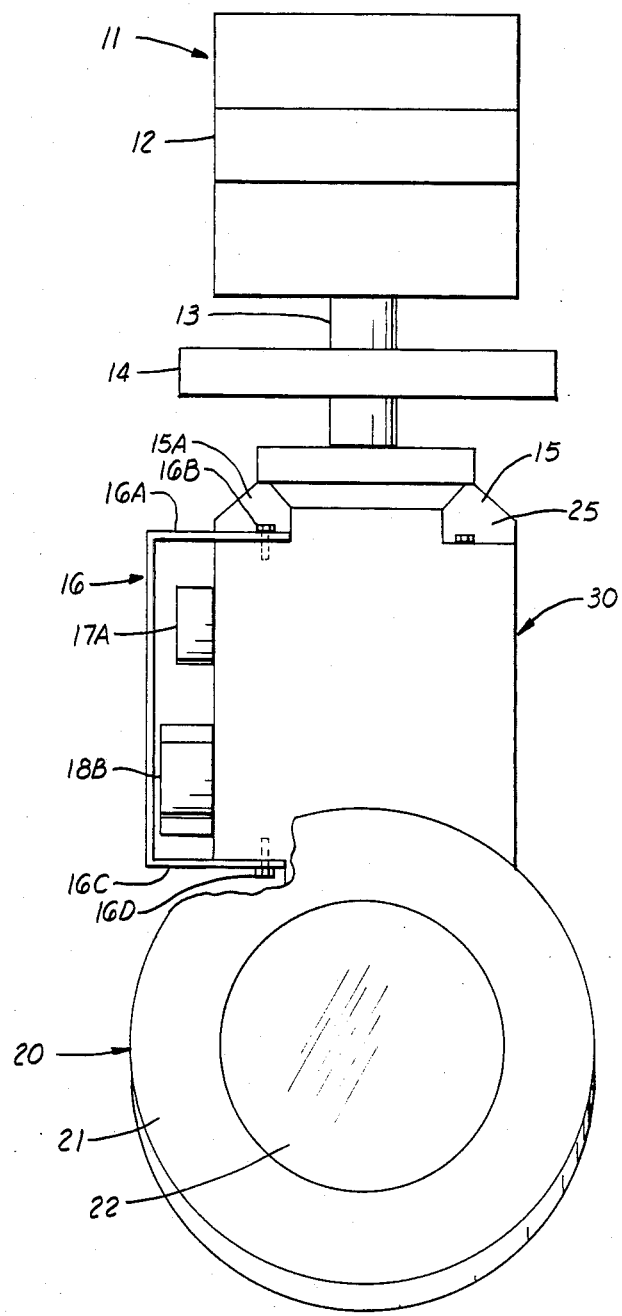
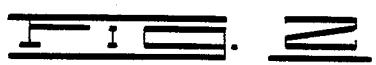

SHIELD

The present invention relates generally to instrument protection and more specifically to protection for outside sight instruments contained by motor driven travel units and more specifically by military tanks.

Internal sight means is needed to work for some person contained within moving equipment, and some of such sight means must be useable in the dark, during stormy weather or during combat where personnel protection of such unit is an item of concern. Additionally, while in some cases such sight equipment is readily fixed in sight-position use within the traveling unit, in other cases, because space in itself is an item of concern, the sight equipment is seperately accessably stored, or packed, with the traveling unit, readily available for movement and sight positioning by the driver or his assistant when needed. Such transfer need to the position of use, is accomplished within the the subject traveling motor driver unit by a transfer from its protective storage travel point therein, to insertion in the actual unit position for actual use. It had been found that due to the closed quarters available, injury to the electrical and mechanical instrumentation parts of the sight unit can easily be accomplished, unless great care is taken during the transfer from storage and the placement in the sight position within the motor driven vehicle. In fact, protection is readily needed to remove injury occurring when the sight unit is in fixed position for use within the driver unit and the driven unit is, or is not, in actual operation.

The effect of this and other damage to the sight viewing unit use and transportation to and within the mobil military travelunit, for example, i,e,, the physical and continued workablility thereof, is established by this invention which provides protective and workable means against viewing sight unit instrument control damage, said device comprising a finger opening protection panel plate having affixed thereto side attachment means, said finger panel having an upper lateral finger opening-end abutting and a lower acute bilateral opening having a part thereof extending into a lower side attachment to effect said opening systems predetermined fixation to controls systems and provide top control physical protection and reasonable finger operation of said control system.

The above given and othe advantages of the present invention will become readily apparent from the following detailed description of one selected embodiment. Particularily when taken with the accompanying drawings here where like referanced numericals refer to like parts and wherein:

FIG. 2, is the perspective front view of the night/day sight body given in FIG. 1.

Figure 1:
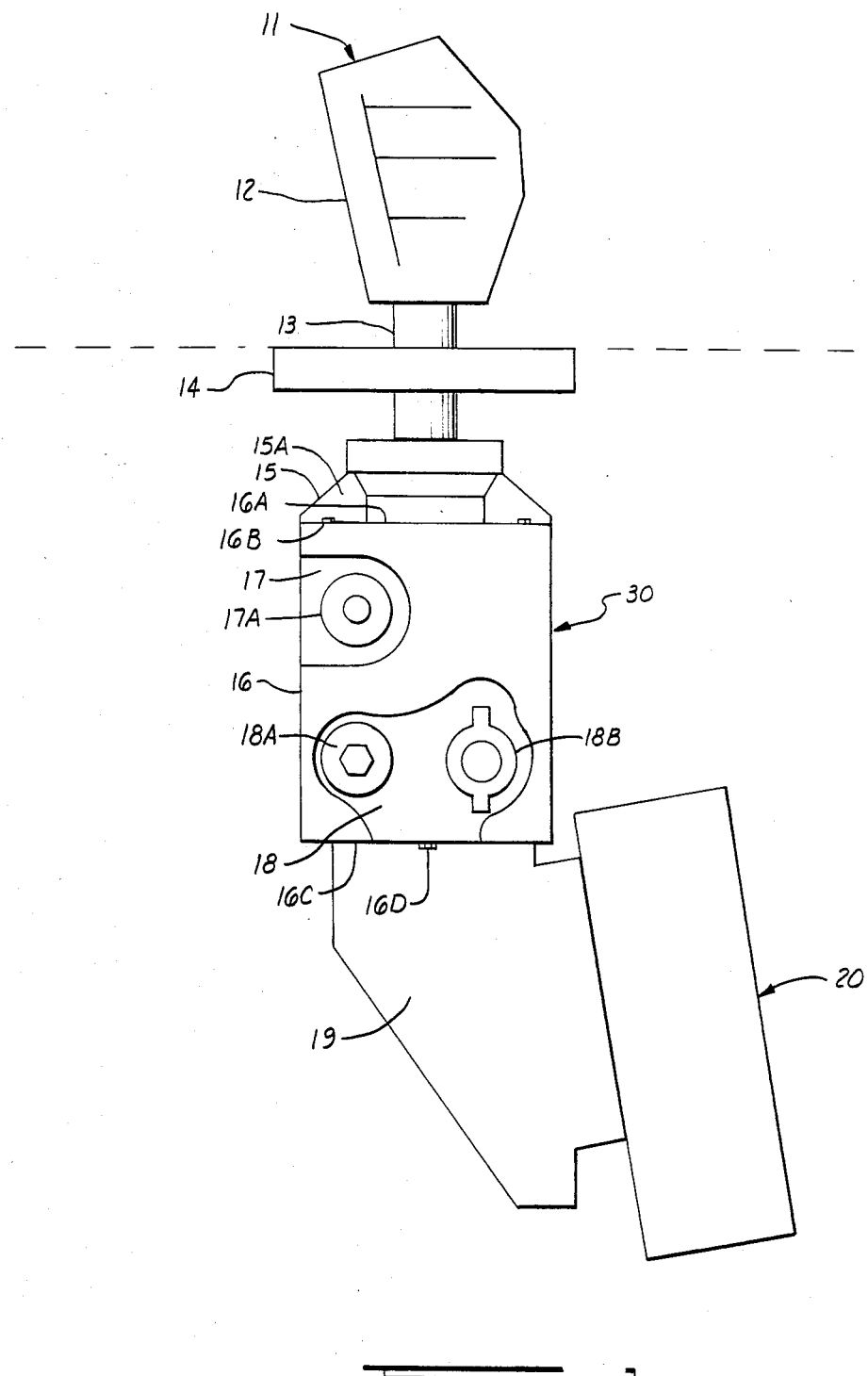
FIG. 1, is a perspective side view of a night/day vision sight body being used to protect a military AN/VVS-2 viewer for tanks, here having the invention protection means.
Figure 3:
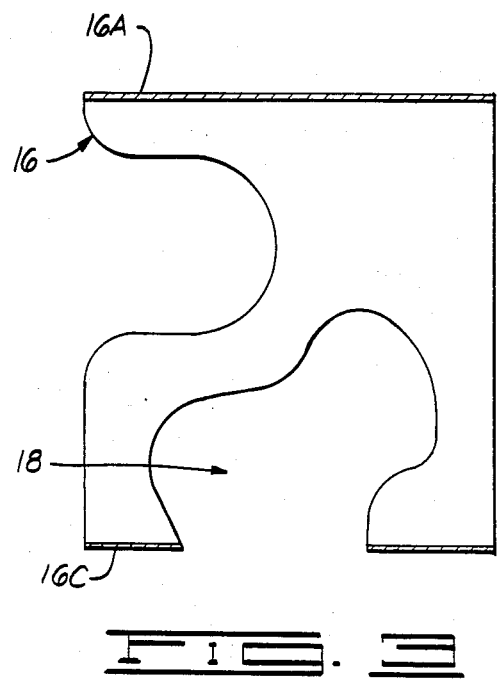
Figure 4:
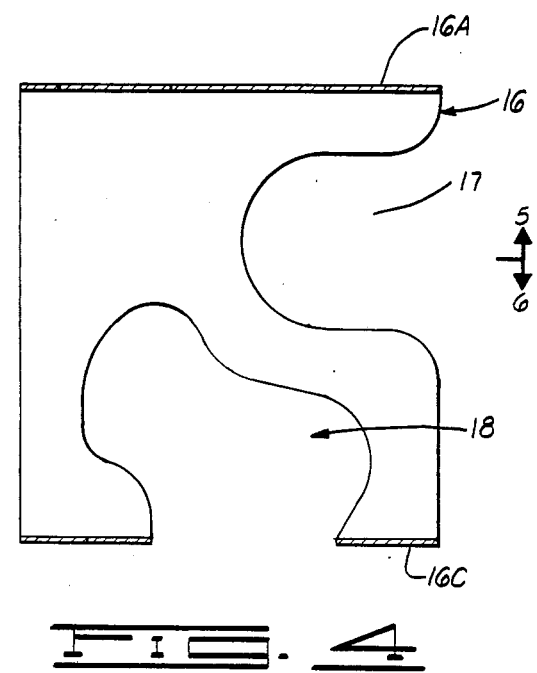
Figure 5:
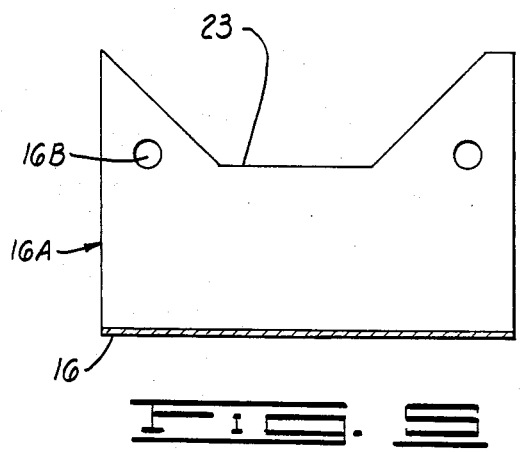
Figure 6:
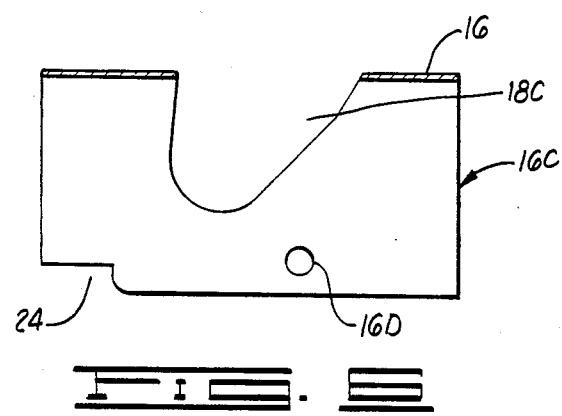

FIGS. 3 and 4, are plane views of the protective face, or shield, of the instant invention, and FIGS. 5 and 6, are respectifully perspective side views of the upper and lower shield side attachment means contained in the control means given in FIGS. 1 and 2 above.

Referring to the drawings in more detail, the FIGS. 1 and 2 drawings, show that the invention is particularly adapted to be embodied in the military AN/VVS-2 tank system which is also storable within the tank vehicle when not in actual use, and maintained therein when such use is needed. In FIG. 1, the side view of the night vision periscope system 11 contains and outside sight head 12, for both sight and light projection, attached to metal tubing 13, which procedes down to embodiment within the mechanical and electrical instrument housing head 15. The shouldered attachment 14, is moveably center-contained by tubing 13, to establish and have a mounting means within the moveable vehicle outside opening for this vision system 11, when it is so needed for use. The tubular piece 13, is fixedly received by embodiment in the housing head 15, of instrument control system 30 at the lower end and fixedly received at the upper end by engagement with drivers periscope hollow shoulder attachment 13.

The bottom of the instrument control housing 30, extends in a hollow shaped, L-shaped faction 19, to the internal viewer 20 having a magnified lens 22 (FIG. 2) protected by padded sides 21, extending vertically a distance above the surface of lens 22 for protection purposes.

Referring back to the mechanical and electrical control and operational components contained within control housing 30, the housing 30 has removable sides in place by screws (not shown) and is removable if work is needed within regarding the mechanical 17 and/or electrical 18 components of the housing control means 30.

The removable control plate 16 of the invention, is shown affixed to housing 30 by screws 16B, upper, and 16D, lower, of housing 30. Upper undulations 25 in housing 15, are for fixing the place for the attachment of the upper 16A and lower 16C, attachable plates through the section or bottom of control plate 16, into the control head encasement 15.

In FIG. 1, three control elements are shown in this preferred embodiment. The upper control unit opening 17, embodies a closed dry cell battery receptical 17A, with opening 17 being of a side U-shape configuration, is sufficient for adaquate protection against potent damage thereto by use, or system 11 removal from use, due to unintended brushing against unit 17A by the operator, or against the tank interior. The lower acute bilateral opening is encompassed in two openings for two units, i.e., the electrical power receptical 18A and the light intensification nob 18B, with "on" and "off", plus the intensification of the light bulb by nob 18B to control the activity of light eminating from the face (not shown) of light head 12.

The finger work control plate 16, is positioned or attached firmly, to the housing 30 by the side plate 16A, upper, and 16C, lower, to permit sufficient distance above control means of nobs 18A, 18B and 17A, of the instrument control system 30, to permit easy hand working by the user and to provide the needed and intended protection by virtue of this invention. The control plate 16 side view in FIG. 2, shows the two upper and lower sides 16A and 16C of plate 16 and the side affixation by screws 16B and 16D to the upper shoulder plate 16A in control head 15 of control housing 30, and lower side plate 16C respectively, with the appropriate shown removal of part or the padded lightside 21 of the viewer light 20, so that the attachment of the lower side 16C to the control means 30 can be seen. The side of the invention is seen with the upper side 16 being reasonably and necessarily a distance from the top of upper control piece 17A and lower control piece 18A, 18B and 18C. This is again a feature of the invention since protection of the energy and control pieces is the basic purpose of the invention and the continued protection through easy working of these pieces by the user is the other factor of this invention. The protection control plate 16 is preferably metal and of a metal that is strong and not brittle, a metal that does not have a short life and is not reactive to the movement experienced by the military tank and the physical abuttment by the men or persons in control thereof.

Obviously the finger holes 17 and 18 are smooth edged to remove the possibility of cutting or other damage and are of sufficient diameter of overall area to permit reasonable finger control of the here-given dry cell battery receptical opening 17A, the electrical power receptical 18A and the light intensified nob 18B, where the opening extends to the side to give clear view and finger workage of the light nob 18B and its "off" and "on" positions.

Preferrably, here the finger hole 17 is, as shown in FIG. 2, and in both 4 and 5, side U-shaped and, most preferrably, from about 1 and 13/16 to about 1 and 11/16 inches, while the lower finger hole 18 is, most preferrably, from about 2 and 11/16 inches wide to about 3 an ⅛ inches in length, extending to lower attachable plate 16C; however, the holes could be of any shape depending on what they are protecting by virtue of their position or the position of the protective control plate 16. The control plate 16 is constructed, when the sides of plates 16A and 16B are affixed to the instrument control means 30, to protect the tops of the instruments or feature heads, by being close enough to allow finger work control by the person involved, or to avoid having the control plate taken off to allow the necessary action of the feature heads 17A, 18A, 18B and 18C. A reasonable ordinary workable preferred distance between the base of the shown control plate 16, is between about ½ and 1 inch above the upper end of the feature heads 17A, 18A and 18B.

With refferrence to FIG. 3, the protective control plate 16, is given with the upper finger opening 17 shown in the upper left part of the plate 16 and opening to the left side while the lower finger opening 17, shown in the upper left of the plate 16, and opening to the left side while the lower finger opeining 18 is shown as bilateral with the upper left for finger control of the electrical power receptical 18A and higher right for finger control of the light intensifier nob 18B, as shown in FIG. 1. The ends of the upper side 16A and the lower side 16C are given and depicted in detail in FIGS. 5 and 6. FIG. 4, is simply an inside look at control plate 16 depicted in FIG. 3. The openings given for the upper finger opening 17, and the lower finger opening 18, are such as is necessary to provide the, here selected and shown, protection and workability of the instrumentation involved.

FIG. 5, simply depicts the upper movable side plate 16 of the protective control plate 16. The opening 23 is sufficient to permit the necessary side 16A fitting by screws (screw holes 16B) in the induction of recess 25 of control head 15. The edge of 16 is appropriately marked.

FIG. 6, simply depicts the lower side plate 16C of the projecting control plate 16. The opening 24 is simply necessary in this preferred embodiment, for fitting the side for screw attachment 16D through the opening to the lower side of instrument control means 30. The edge of upper control plate 16 is given along the upper end of plate 16C and the lower continuation 18C of opening 18 is as a preferred opening here.

While the particular embodiments of the present invention have been shown and described, it will be obvious to those skilled in the art that changes and modifications may be made without departing from this invention in its broad sense and abstracts and, therefore, the aim, i.e., the appended claims, is to cover all such changes and modifications as fall within the true spirit and scope of this invention.

What is claimed is:

1. A panoramic, night/day military periscope having operational instruments with abutting controls projecting therefrom, and having an operational control improvement comprising a finger plate shield having positioned therein finger openings, and side plates extending a length to encase said periscope, said side plate endposition being predetermined to place said finger plate finger openings respectively adjacent said operational controls for physical protection thereof and finger operation of said controls.

2. The viewing system of claim 1, wherein said finger plate and said side plates are made of materials selected from the group consisting of metal, polymers, copolymers and mixtures thereof.

* * * * *